United States Patent
Schwarz

(10) Patent No.: US 8,676,508 B2
(45) Date of Patent: Mar. 18, 2014

(54) METHOD FOR DETERMINING A ROAD PROFILE OF A LANE LOCATED IN FRONT OF A VEHICLE

(75) Inventor: Tilo Schwarz, Elchingen (DE)

(73) Assignee: Daimler AG, Stuttgart (DE)

( * ) Notice: Subject to any disclaimer, the term of this patent is extended or adjusted under 35 U.S.C. 154(b) by 125 days.

(21) Appl. No.: 13/133,682

(22) PCT Filed: Jan. 18, 2010

(86) PCT No.: PCT/EP2010/000249
§ 371 (c)(1),
(2), (4) Date: Jun. 9, 2011

(87) PCT Pub. No.: WO2010/083971
PCT Pub. Date: Jul. 29, 2010

(65) Prior Publication Data
US 2011/0245995 A1 Oct. 6, 2011

(30) Foreign Application Priority Data
Jan. 23, 2009 (DE) .......................... 10 2009 006 000
Jul. 14, 2009 (DE) .......................... 10 2009 033 219

(51) Int. Cl.
*G01S 13/88* (2006.01)
(52) U.S. Cl.
USPC ................................. 701/534; 701/1; 342/70

(58) Field of Classification Search
USPC ................... 701/1, 534, 535, 536; 342/70, 71
See application file for complete search history.

(56) References Cited

U.S. PATENT DOCUMENTS

| 6,292,752 | B1 | 9/2001 | Franke et al. |
| 6,823,241 | B2 | 11/2004 | Shirato et al. |
| 6,963,657 | B1 | 11/2005 | Nishigaki et al. |
| 2002/0087253 | A1 | 7/2002 | Jeon |

FOREIGN PATENT DOCUMENTS

| DE | 19749086 C1 | 8/1999 |
| DE | 10127034 A1 | 12/2002 |
| DE | 102005038314 A1 | 9/2006 |
| EP | 1193661 A1 | 4/2002 |
| GB | 2151872 A | 7/1985 |
| WO | WO 2006094585 A1 * | 9/2006 |

* cited by examiner

*Primary Examiner* — Mary Cheung
*Assistant Examiner* — Rodney Butler
(74) *Attorney, Agent, or Firm* — Patent Central LLC; Stephan A. Pendorf

(57) ABSTRACT

A method for determining a road profile of a lane located in front of a vehicle via sensed image data (1) and/or sensed inherent vehicle movement data (2). An estimating device (3) is provided, to which the sensed image data (1) and/or the sensed inherent vehicle movement data (2) are supplied. A road elevation profile (P) of the lane located in front of the vehicle is determined via the sensed image data (1) and/or the sensed inherent vehicle movement data (2).

15 Claims, 2 Drawing Sheets

METHOD FOR DETERMINING A ROAD PROFILE OF A LANE LOCATED IN FRONT OF A VEHICLE

BACKGROUND OF THE INVENTION

1. Field of the Invention

The invention relates to a method for determining a road profile of a lane located in front of a vehicle by means of sensed image data and/or sensed inherent vehicle movement data, wherein an estimating device is provided, to which the sensed image data and/or the sensed inherent vehicle movement data are supplied.

2. Description of the Related Art

From DE 197 49 086 C1 is known a device and a method for determining data indicative for a course of a lane, which contains a lane recognition sensor system, an object position sensor system, which senses at least one distance to an object located in front of a vehicle and its direction angle with regard to a vehicle movement direction and an inherent vehicle movement sensor system. An estimating device is provided thereby, to which are supplied lane recognition measuring data, object position measuring data and inherent vehicle movement data and which determines a lane curvature and/or a transverse position of a respective object in front of the vehicle relative to the lane by estimating by means of a pre-settable estimating algorithm containing a dynamic vehicle movement model in dependence thereof. The estimating device comprises a Kaiman filter for this. The method and the device are particularly used in road vehicles.

BRIEF SUMMARY OF THE INVENTION

The invention is based on the object to provide a method, by means of which a road elevation profile of a lane located in front of a vehicle is determined.

The method according to the invention provides that a road profile of a lane located in front of the vehicle is determined by means of sensed image data and/or sensed inherent vehicle movement data, wherein the image data and/or the inherent vehicle movement data are supplied to an estimating device. According to the invention, a road elevation profile of the lane located in front of the vehicle is determined by means of the sensed image data and the sensed inherent vehicle movement data.

With the help of the inherent vehicle movement estimated by the estimating device the road elevation profile estimated from measurements is successively composed to a continuous road elevation profile independent of the inherent vehicle movement. The road elevation profile is thereby composed for example in a world coordinate system or so-called inertial coordinate system. A continuous road elevation profile of wheel lanes driven on is determined thereby. The inherent vehicle movement can hereby be based on an estimate of image data and on an estimate of vehicle data.

A measurement of road elevation data is thereby designated as a measuring process carried out in regular time intervals, wherein the road elevation profile is advantageously determined while including the inherent vehicle movement data.

Alternatively to this, the road elevation can also be determined without a direct measurement of inherent vehicle movement data by means of an estimate of the inherent vehicle movement by means of at least one camera image over time.

In particular, the road elevation profile in front of the vehicle is measured and integrated over time in such a manner that for example ground unevenness to be expected are known at respective wheel positions of the vehicle, when the vehicle drives over a previously measured region. The road elevation profile is thus integrated over time in such a manner that existing ground unevenness can be determined at the respective wheel positions of the vehicle, before these are driven over by the vehicle.

A drive speed, a yaw rate and/or wheel speeds are for example sensed as inherent vehicle movement data, which is or are determined by sensing units arranged at the vehicle.

In a particular advantageous manner, at least one chassis function, chassis control and/or chassis regulation of the vehicle is controlled and/or regulated in dependence on the determined road elevation profile (P) of the lane located in front. This can be arbitrary chassis systems or components of chassis systems in this connection, for example a vehicle level regulation, active roll stabilization, adjustment damping, adjustment springs and steering mechanisms.

The road elevation profile determined according to the method according to the invention can particularly be based on different vehicle functions. Among the vehicle functions are for example a forward-looking active chassis regulation, an adjustment damping, a roll stabilization and/or a pre-adjustment of a power train with an anticipated hill or valley drive. The method is at the same time suitable in connection with an automatic light control.

BRIEF DESCRIPTION OF THE DRAWINGS

Embodiments of the invention are explained in more detail by means of drawings.

It shows thereby.

DETAILED DESCRIPTION OF THE INVENTION

Figure 1:
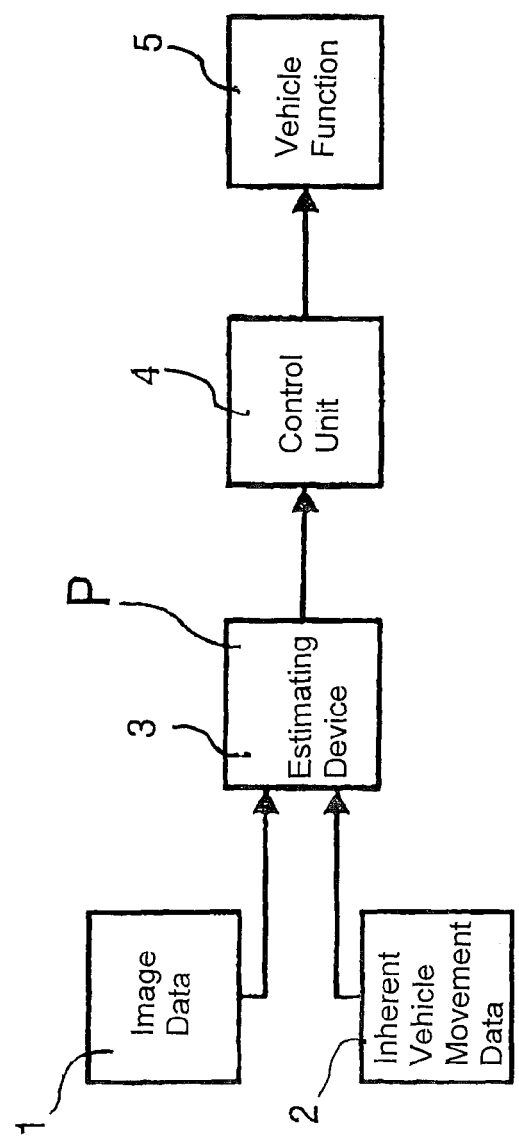
FIG. 1 schematically a block diagram of an implementation of the method according to the invention, and FIG. 2 schematically a course of method steps of the method according to the invention.

Parts corresponding to each other are provided with the same reference numerals in all figures.

In FIG. 1 is shown a block diagram of an implementation of the method according to the invention.

A device for implementing the method according to the invention comprises at least one image recording unit, preferably two image recording units, in the form of a camera, which is or are for example arranged in a front region of a vehicle.

The at least one image recording unit senses image data 1 of a lane located in front of the vehicle in a given time interval, for example in the millisecond region. The image data 1 are particularly afflicted with noise at least due to inherent noise processes of a camera, as for example thermal noise and/or transducer noise.

The term noise thereby designates a deterioration of digitally and/or electronically recorded image data 1 by disruptions. The disruptions express themselves particularly in pixels, which are distinguished for example in color and/or brightness from the noise-free actual image data 1 of an image recording.

The recorded image data 1 are guided to an estimating device 3, for example a Kaiman filter, wherein the Kaiman filter is a stochastic state estimate of dynamic systems.

The vehicle moves corresponding to the vehicle inherent movement, within a time interval.

After each image recording, an optimum road elevation profile P is determined, particularly estimated from the image data 1 sensed in the last cycle and for example via inherent vehicle movement data 2 determined via sensing units arranged at the vehicle by means of the estimating device.

The sensed inherent vehicle movement data 2 are supplied to the estimating device 3, particularly via a bus system arranged in the vehicle, for example a CAN bus.

For example a vehicle speed, a yaw rate, steering angle, steering angle speed and/or wheel speeds of the vehicle are thereby sensed as vehicle data 2.

If two image recording units are arranged at the vehicle, for example a displacement of the same world point in pixels of different image recordings of the image recording units sensed at the same time can serve for a determination of the road elevation profile P by means of the image data 1, which were recorded in a time interval, which is called disparity.

In a possible embodiment, a displacement of a same world point in pixels of image recordings of an image recording unit at different times can also be used for determining the road elevation profile P.

Seen formally, the method according to the invention is a stochastic measuring process, as image data 1 sensed by the at least one image recording unit are subject to different noise influences, as e.g. a thermal noise and/or a static noise.

The vehicle moves again corresponding to a physical movement equation, whereby additionally unknown disturbance, input and/or noise terms are generated. A system part, that is, the vehicle and an environment, particularly a road, is thereby continuous in time and a data sensing discrete in time.

An optimum choice of a representation of an estimate magnitude in the state vector of a measuring system has a considerable influence on a measuring system arrangement, for example with the image processing. For this, a non-obvious representation of the road elevation profile P in a disparity space is particularly suitable, with the coordinates: image column, image row, disparity.

The consequence of this is a possible parameterization of the measuring system, for example of the image processing.

The following formalization results:

Time-continuous development of the measuring system:

$$x'(t) = f(x(t), V(t), t) \quad [1]$$

with x'=first derivation of x over time, x=system state, v=system noise and t=time.

The system state x(t) contains all vehicle-related magnitudes and parameters of the road elevation profile P.

Measuring process.

$$y_n = h_n(x_n, w_n, t_n) \quad [2]$$

with y=measurements, h=measuring function, which converts the system state to measurements or describes the measurements, x=system state, w=measuring noise, t=time, n=time step.

Such a measuring process can for example be followed by means of a predictor corrector method. In order to save calculation time and/or stores, the system state can also be separated into several partial system states, e.g. inherent vehicle movement and profile data, which are then estimated separately. In order to increase the exactness, the correction step can be passed through several times.

By means of a parameterization of a measuring method, for example the image processing, the road elevation profile P can be determined in an advantageous manner e.g. also with driving in bends and with image data 1, which were recorded in a stereo method. The uncertainty of the road elevation profile in location and/or time is thereby estimated with the help of the estimating device 3, wherein measuring algorithms, e.g. the image processing, can be parameterized by means of the estimated uncertainties. A calculation time is thereby reduced in a particularly advantageous manner and a measuring exactness is increased.

As all covariances of the parameters are estimated at each time step, search regions in the image and/or disparity space for this time section can be determined in an exact manner even when considering a momentary statistic uncertainty.

The determined road elevation profile P is preferably supplied to a control unit 4, which for example controls and/or regulates a vehicle function 5 such as forward-looking active chassis regulation for comfort improvement, an adjustment dampening, a roll stabilization and/or a pre-adjustment of a power train with an anticipated hill or valley drive.

The road elevation profile P is measured in front of the vehicle and integrated over time in such a manner that the ground unevenness to be expected is known at a respective vehicle wheel of the vehicle in a particularly advantageous manner, when the vehicle drives over the region to be measured. All statistic uncertainties between all variables of the system are estimated over time, wherein the measuring system is parameterized by means of the estimated uncertainties before each measurement. In this manner, a chassis of the vehicle can for example be regulated in such a manner that e.g. elevation movements, which otherwise occur due to the ground unevenness, are avoided in an advantageous manner.

Figure 2:
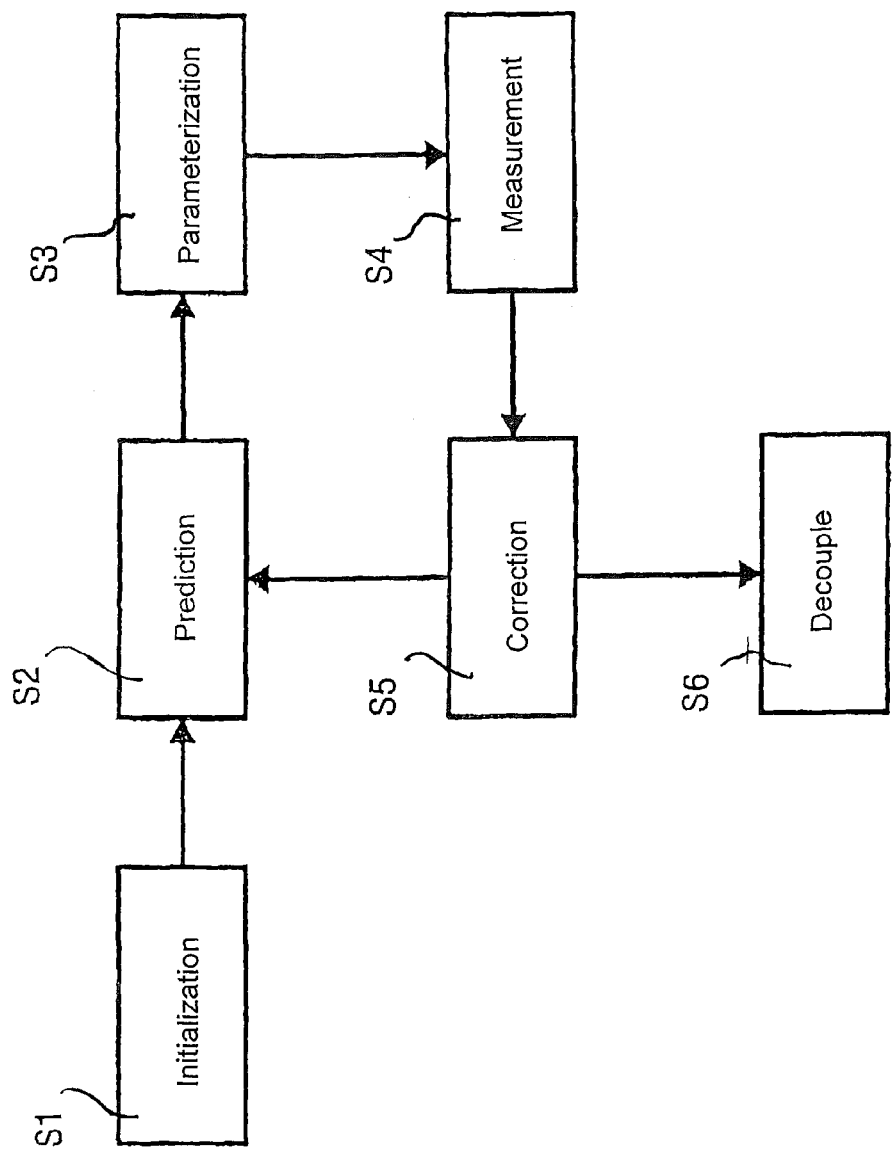

FIG. 2 shows a summary of individual method steps for carrying out the method according to the invention.

In a first step S1, an initialization, thus a pre-adjustment of the system for carrying out the method takes place. A required storage space is for example reserved in the first step S1.

Subsequently, in a second step S2, a prediction of the system state and expected measurements are carried out at a next time step.

In a third step S3, the measuring methods, for example the image processing, are parameterized wherein the measurement is carried out in a fourth step S4.

By means of the measurements carried out in step S4, a correction of the system state with regard to the inherent vehicle movement and the parameters of the road elevation profile P is carried out in a fifth step S5, wherein a feedback with regard to the parameterization of the measuring algorithms can take place.

In a sixth step S6, the road elevation profile P and associated uncertainties are decoupled.

The invention claimed is:
1. A method for determining a road profile of a lane located in front of a vehicle via sensed image data (1) and sensed inherent vehicle movement data (2), comprising:
  providing one or more image sensors,
  using said one or more image sensors to sense the ground unevenness of each wheel path individually,
  providing at least one sensor for sensing inherent vehicle movement data,
  providing an estimating device (3),
  supplying sensed image data (1) and sensed inherent vehicle movement data (2) to the estimating device (3),
  determining the road elevation profile (P) including ground unevenness for each wheel path located in front of the vehicle on the basis of the sensed image data (1) and determining the vehicle location on the basis of the sensed inherent vehicle movement data (2),
  successively composing in the estimating device (3) a continuous road elevation profile including ground unevenness for each wheel path, independent of the inherent vehicle movement, for road previously traveled over, and regulating or controlling at least one chassis function, chassis control and/or chassis regulation of the vehicle in dependence on the determined road elevation profile (P) including the ground unevenness of each wheel path individually of the lane located in front of the vehicle.

2. The method according to claim 1, further comprising regulating or controlling at least one chassis function, chassis control and/or chassis regulation of the vehicle in dependence on the determined road elevation profile (P) including the ground unevenness of each wheel path individually of the lane located in front of the vehicle.

3. The method according to claim 1, further comprising integrating the road elevation profile over time in such a manner that existing ground unevenness at the respective wheel positions of the vehicle can be determined, before they are driven over by the vehicle.

4. A device for actively controlling and/or regulating at least one chassis function, chassis control and/or chassis regulation, comprising:
  one or more image recording units arranged at the vehicle for sensing the ground unevenness of each wheel path individually of a lane in front of the vehicle and supplying sensed image data (1) to an estimating device (3),
  sensing units arranged at the vehicle for sensing an inherent vehicle movement and supplying inherent vehicle movement data (2) to the estimating device (3),
  an estimating device (3), with which the sensed image data (1) and the inherent vehicle movement data (2) can be evaluated for determining a road elevation profile (P) including the ground unevenness of each wheel path individually of the lane located in front of the vehicle, and
  a control unit to which the determined road elevation profile (P)) including the ground unevenness of each wheel path individually of the lane located in front of the vehicle can be supplied, which controls and/or regulates at least one chassis function, chassis control and/or chassis regulation of the vehicle in dependence on the road elevation profile (P).

5. The device according to claim 4, wherein the estimating device (3) includes a predictor corrector unit.

6. The device according to claim 4, wherein an uncertainty of the road elevation profile (P) and/or of inherent vehicle movement data is determined on the basis of the estimating device (3) in dependence on location and/or time.

7. The device according to claim 6, wherein measuring algorithms are parameterized on the basis of the uncertainty of the road elevation profile and/or inherent vehicle movement data determined via the estimating device (3).

8. The device according to claim 4, wherein the estimating device (3) is a Kaiman filter.

9. The method according to claim 1, wherein the road elevation profile is composed in a world coordinate system or inertial coordinate system.

10. The method according to claim 1, wherein said sensed vehicle data includes at least one of vehicle speed, yaw rate, steering angle, steering angle speed and wheel speed of the vehicle.

11. The method according to claim 1, wherein one image recording unit is assigned to each wheel track.

12. The method according to claim 2, wherein said one chassis function, chassis control and/or chassis regulation is at least one of a forward-looking active chassis regulation, a vehicle level regulation, active roll stabilization, adjustment damping, spring adjustment and steering mechanisms.

13. The method according to claim 1, wherein said regulating or controlling comprises:
  adjusting the suspension according to the projected ground unevenness for each respective wheel path.

14. The method according to claim 13, wherein said projected ground unevenness is based on information including previous travel over the road.

15. The method according to claim 13, comprising regulating or controlling at least one chassis function, chassis control and/or chassis regulation of the vehicle in dependence on the determined road elevation profile (P) of the lane located in front of the vehicle including ground unevenness for each wheel path located in front of the vehicle, wherein chassis of the vehicle is regulated in such a manner that elevation movements of the chassis, which otherwise occur due to the ground unevenness, are avoided.

* * * * *